United States Patent
Albinger et al.

(10) Patent No.: US 9,668,405 B2
(45) Date of Patent: Jun. 6, 2017

(54) SMART IGNITION SYSTEM

(71) Applicant: Husqvarna AB, Huskvarna (SE)

(72) Inventors: Matthew Albinger, Shelby, NC (US); Eric Tse, Charlotte, NC (US); Sean Dwyer, Gastonia, NC (US); Bernard Drew, Savannah, GA (US)

(73) Assignee: HUSQVARNA AB, Huskvarna (SE)

( * ) Notice: Subject to any disclaimer, the term of this patent is extended or adjusted under 35 U.S.C. 154(b) by 36 days.

(21) Appl. No.: 14/435,915

(22) PCT Filed: Oct. 17, 2012

(86) PCT No.: PCT/US2012/060584
§ 371 (c)(1),
(2) Date: Apr. 15, 2015

(87) PCT Pub. No.: WO2014/062176
PCT Pub. Date: Apr. 24, 2014

(65) Prior Publication Data
US 2015/0296706 A1    Oct. 22, 2015

(51) Int. Cl.
*F02D 41/28* (2006.01)
*A01D 34/00* (2006.01)
(Continued)

(52) U.S. Cl.
CPC ........... *A01D 34/006* (2013.01); *A01D 34/64* (2013.01); *A01D 34/828* (2013.01); *A01D 2101/00* (2013.01)

(58) Field of Classification Search
CPC .... A01D 34/006; A01D 34/64; A01D 34/828; A01D 2101/00; F02N 11/0822;
(Continued)

(56) References Cited

U.S. PATENT DOCUMENTS 5,818,330 A    10/1998    Schweiger
D406,830 S     3/1999     Herbstritt et al.
(Continued)

FOREIGN PATENT DOCUMENTS

CN    102655737 A    9/2012
DE    19630747 C1    9/1997
(Continued)

OTHER PUBLICATIONS

International Search Report and Written Opinion of PCT/US2012/060584 mailed Jan. 4, 2013.
(Continued)

*Primary Examiner* — Hai Huynh
(74) *Attorney, Agent, or Firm* — Nelson Mullins Riley & Scarborough LLP (57) ABSTRACT

A lawn care device may include an engine to selectively power the device, a frame supporting the engine and an operator of the device, and an ignition interface having processing circuitry configured to define a plurality of operating modes. The operating modes may include at least a starting mode in which the ignition interface is usable by the operator to start the engine, and a running mode in which the engine is running. The ignition interface may include code entry keys configured to, responsive to entry of a code via the code entry keys, enable use of the ignition interface to shift from the starting mode to the running mode without a physical starting key.

20 Claims, 8 Drawing Sheets

(51) Int. Cl.
*A01D 34/82* (2006.01)
*A01D 34/64* (2006.01)
*A01D 101/00* (2006.01)

(58) Field of Classification Search
CPC .......... F02N 11/10; F02N 11/12; F02N 11/14; F02N 15/00; F02N 15/006; F02N 99/002
USPC ................................................ 701/113, 179.3
See application file for complete search history.

(56) References Cited

U.S. PATENT DOCUMENTS

| | | | |
|---|---|---|---|
| D436,604 S | 1/2001 | Rossow et al. |
| D439,257 S | 3/2001 | Rossow et al. |
| 6,292,729 B2 | 9/2001 | Falck et al. |
| 6,445,084 B1 | 9/2002 | Daiss et al. |
| 6,609,357 B1 | 8/2003 | Davis et al. |
| D487,727 S | 3/2004 | Sjögren et al. |
| 7,126,237 B2 | 10/2006 | Walters et al. |
| D546,770 S | 7/2007 | Herbstritt |
| D553,577 S | 10/2007 | Seed et al. |
| D578,272 S | 10/2008 | Kato et al. |
| 7,496,441 B2 | 2/2009 | Brandt et al. |
| D596,146 S | 7/2009 | Vasichek et al. |
| 7,610,975 B1 | 11/2009 | Gust et al. |
| D629,763 S | 12/2010 | Reedy |
| D635,101 S | 3/2011 | Farrow |
| 7,992,603 B2 | 8/2011 | Pellymonter |
| D656,440 S | 3/2012 | Klein |
| 8,171,907 B2 | 5/2012 | Koenen et al. |
| 8,261,872 B2 | 9/2012 | Vasichek et al. |
| 8,381,885 B2 | 2/2013 | Huibregtse et al. |
| 8,668,036 B2 | 3/2014 | Wyatt et al. |

FOREIGN PATENT DOCUMENTS

| | | |
|---|---|---|
| EP | 0982202 A2 | 3/2000 |
| FR | 2789950 A1 | 8/2000 |
| WO | 2004005086 A2 | 1/2004 |

OTHER PUBLICATIONS

International Preliminary Report on Patentability of PCT/US2012/060584 mailed Jan. 8, 2015.

SMART IGNITION SYSTEM

TECHNICAL FIELD

Example embodiments generally relate to outdoor power equipment and, more particularly, some embodiments relate to an ignition system for a lawn care vehicle.

BACKGROUND

Lawn care tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines and are relatively inexpensive. Meanwhile, at the other end of the spectrum, riding lawn mowers, such as lawn tractors, can be quite large. Riding lawn mowers can sometimes also be configured with various functional accessories (e.g., trailers, tillers and/or the like) in addition to grass cutting components. Riding lawn mowers provide the convenience of a riding vehicle as well as a typically larger cutting deck as compared to a walk-behind model.

Ignition systems for many handheld or walk behind outdoor power equipment devices are based on a recoil start (or pull start). In such a device, a rope with a grip at the end is coiled around a mechanism that is coupled to an end of the crankshaft. When the rope is pulled to cause uncoiling, the crankshaft spins to crank the engine. Larger pieces of equipment such as riding lawn mowers more commonly employ electric starters. Electric starters are generally used by larger pieces of equipment since the electric starting motor (or starter motor) of such devices typically requires battery power that is more practically supportable by a larger device. A common electric starter may include a starter solenoid. A key operated switch is typically used to apply battery power to the solenoid. Application of power to the solenoid through the key operated switch closes high current contacts for the starter motor to cause it to turn for a limited period of time to start the engine.

Although the use of a key operated switch is relatively familiar to many users, it represents a relatively limited user interface. Thus, it may be desirable to provide an improved, or more modern, user interface for vehicle starting. The provision of such an improved interface may also enable the provision of additional functionality that had not previously been possible to deliver.

BRIEF SUMMARY OF SOME EXAMPLES

Some example embodiments may provide an electronic ignition system for employment, for example, with riding lawn care equipment. The electronic ignition starting system may be considered to be a "smart ignition" system by virtue of the additional functionality it may provide relative to a conventional key operated switch in a starter system. Some example embodiments may improve the ability of operators to operate outdoor power equipment such as riding lawn mowers. In this regard, some embodiments may provide an intuitive interface that is multi-functional. Operators may therefore take fuller advantage of the capabilities of their outdoor power equipment devices, and have a greater satisfaction with the performance of their outdoor power equipment devices.

In an example embodiment, a lawn care device is provided. The lawn care device may include an engine to selectively power the device, a frame supporting the engine and an operator of the device, and an ignition interface having processing circuitry configured to define a plurality of operating modes. The operating modes may include at least a starting mode in which the ignition interface is usable by the operator to start the engine, and a running mode in which the engine is running. The ignition interface may include code entry keys configured to, responsive to entry of a code via the code entry keys, enable use of the ignition interface to shift from the starting mode to the running mode without a physical starting key.

In another example embodiment, a method of controlling a lawn care device is provided. The method may include receiving input from an operator of the device via an ignition interface having processing circuitry configured to define a plurality of operating modes of the ignition interface, and determining, via the processing circuitry, a function to associate with the input received based on a current operating mode. The method may further include executing the function associated with the input received. At least one function for which the processing circuitry is configured may include enabling initiation of a shift of the ignition interface from a starting mode, in which the ignition interface is usable by the operator to start the engine, to a running mode, in which the engine is running, in response to determining that the input received is a valid code without a physical starting key.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 3, which includes

FIG. 4, which includes

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. Additionally, the term "lawn care" is meant to relate to any yard maintenance activity and need not specifically apply to activities directly tied to grass, turf or sod care. As used herein, operable coupling should be understood to relate to direct or indirect connection that, in either case, enables functional interconnection of components that are operably coupled to each other.

Figure 1:
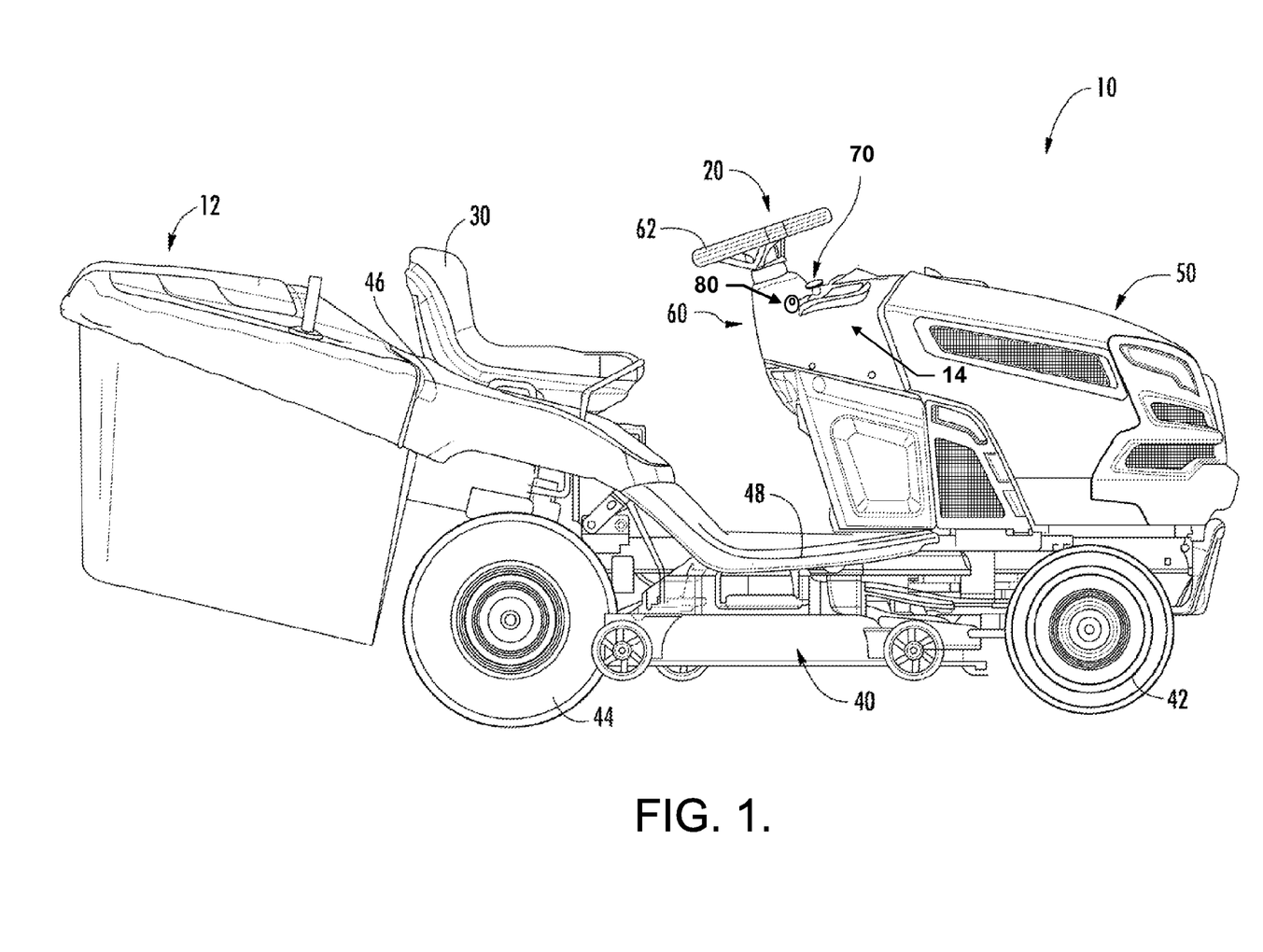
FIG. 1 illustrates a perspective view of the riding lawn care vehicle according to an example embodiment.

FIG. 1 illustrates an example lawn care device in the form of a riding lawn care vehicle 10 having a bagging attachment 12. However, it should be appreciated that example embodiments may be employed on numerous other riding lawn care vehicles that may not include a bagging attachment 12. The riding lawn care vehicle 10 may also include an operations panel 14 that may display operational information regarding the riding lawn care vehicle 10 and host various controls, gauges, switches, displays and/or the like. As shown and described herein, the riding lawn care vehicle 10 may be a riding lawn mower (e.g., a lawn tractor, front-mount riding lawn mower, riding lawn mower with a zero or near zero degree radius of turn, cross mower, stand-on riding lawn mower, and/or the like). However, other example embodiments may be employed on other outdoor power equipment devices, such as walk behind lawn mowers, tillers, snow throwers, and/or the like.

The riding lawn care vehicle 10 may include a steering assembly 20 (e.g., including a steering wheel, handle bars, or other steering apparatus) functionally connected to wheels of the riding lawn care vehicle 10 to which steering inputs are provided (e.g., the front and/or rear wheels in various different embodiments) to allow the operator to steer the riding lawn care vehicle 10. In some embodiments, the riding lawn care vehicle 10 may include a seat 30 that may be disposed at a center, rear or front portion of the riding lawn care vehicle 10. The operator may sit on the seat 30, which may be disposed to the rear of the steering assembly 20 to provide input for steering of the riding lawn care vehicle 10 via the steering assembly 20.

The riding lawn care vehicle 10 may also include, or be configured to support attachment of, a cutting deck 40 having at least one cutting blade mounted therein. In some cases, a height of the at least one cutting blade may be adjustable by an operator of the riding lawn care vehicle 10. The cutting deck 40 may be a fixed or removable attachment in various different embodiments. Moreover, a location of the cutting deck 40 may vary in various alternative embodiments. For example, in some cases the cutting deck 40 may be positioned in front of the front wheels 42, behind the rear wheels 44, or in between the front and rear wheels 42 and 44 (as shown in FIG. 1) to enable the operator to cut grass using the at least one cutting blade when the at least one cutting blade is rotated below the cutting deck 40. In some embodiments, the cutting deck 40 may be lifted or rotated relative to the lawn mower frame to permit easier access to the underside of the lawn mower without requiring removal of the cutting deck 40. The cutting deck 40 may have one, two, three, or more cutting blades driven by one, two, three, or more rotatable shafts. The shafts may be rotated by any number of mechanisms. For example, in some embodiments the shafts are coupled to a motor via a system of belts and pulleys. In other embodiments the shafts may be coupled to the motor via a system of universal joints, gears, and/or other shafts. In still other embodiments, such as in an electric lawn mower, the shaft may extend directly from an electric motor positioned over the cutting deck.

In some embodiments, the front wheels 42 and/or the rear wheels 44 may have a shielding device positioned proximate thereto in order to prevent material picked up in the wheels from being ejected toward the operator. Fender 46 is an example of such a shielding device. When operating to cut grass, the grass clippings may be captured by a collection system (e.g., bagging attachment 12), mulched, or expelled from the cutting deck 40 via either a side discharge or a rear discharge.

The riding lawn care vehicle 10 may also include additional control related components such as one or more speed controllers, brakes, cutting height adjusters and/or the like. Some of the controllers, such as the speed controllers and/or brakes, may be provided in the form of foot pedals that may sit proximate to a footrest 48 (which may include a portion on both sides of the riding lawn care vehicle 10) to enable the operator to rest his or her feet thereon while seated in the seat 20.

In the pictured example embodiment of FIG. 1, an engine 50 of the riding lawn care vehicle 10 is disposed substantially forward of a seated operator. However, in other example embodiments, the engine 50 could be in different positions such as below or behind the operator. In some embodiments, the engine 50 may be operably coupled to one or more of the wheels of the riding lawn care vehicle 10 in order to provide drive power for the riding lawn care vehicle 10. In some embodiments, the engine 50 may be capable of powering two wheels, while in others, the engine 50 may power all four wheels of the riding lawn care vehicle 10. Moreover, in some cases, the engine 50 may manually or automatically shift between powering either two wheels or all four wheels of the riding lawn care vehicle 10. The engine 50 may be housed within a cover that forms an engine compartment to protect engine 50 components and improve the aesthetic appeal of the riding lawn care vehicle 10.

In an example embodiment, the engine compartment may be positioned proximate to and/or mate with portions of a steering assembly housing 60. The steering assembly housing 60 may house components of the steering assembly 20 to protect such components and improve the aesthetic appeal of the riding lawn care vehicle 10. In some embodiments, a steering wheel 62 of the steering assembly 20 may extend from the steering assembly housing 60 and a steering column (not shown) may extend from the steering wheel 62 down through the steering assembly housing 60 to components that translate inputs at the steering wheel 62 to the wheels to which steering inputs are provided.

In some embodiments, the engine 50 may also provide power to turn the cutting blade or blades disposed within the cutting deck 40. In this regard, for example, the engine 50 may be used to turn a shaft upon which the cutting blade or blades may be fixed (e.g., via a belt and pulley system and/or other mechanisms). The turning of the shaft, at high speeds, may move the cutting blade or blades through a range of motion that creates air movement that tends to straighten grass for cutting by the moving blade and then eject the cut grass out of the cutting deck 40 (e.g., to the bagging attachment 12 or to the back or side of the riding lawn care vehicle 10), unless the blade and mower are configured for mulching.

In an example embodiment, the engine 50 may turn at least one shaft that is coupled to corresponding ones of one or more cutting blades within the cutting deck 40 via a PTO clutch. When the PTO clutch is engaged, rotary power generated by the engine 50 may be coupled to the one or more cutting blades to cause rotation thereof (e.g., for cutting grass). When the PTO clutch is disengaged, rotary power generated by the engine 50 may not be coupled to the one or more cutting blades and thus the cutting blades may not rotate. In some embodiments, engagement of the PTO clutch may be accomplished via operation of a PTO switch 70 that may be disposed on or proximate to the operations panel 14.

The operations panel 14, or some other portion of the steering assembly housing 60, may also provide support for an ignition interface 80 of an example embodiment. The ignition interface 80 may be used for starting the engine 50 and for controlling other functions of the riding lawn care vehicle 10. In an example embodiment, the ignition interface 80 may not require a key to operate. Thus, the operator of the riding lawn care vehicle 10 may be enabled to start and/or initiate one or more functional capabilities of the riding lawn care vehicle 10 without the use of a physical key.

Figure 2:
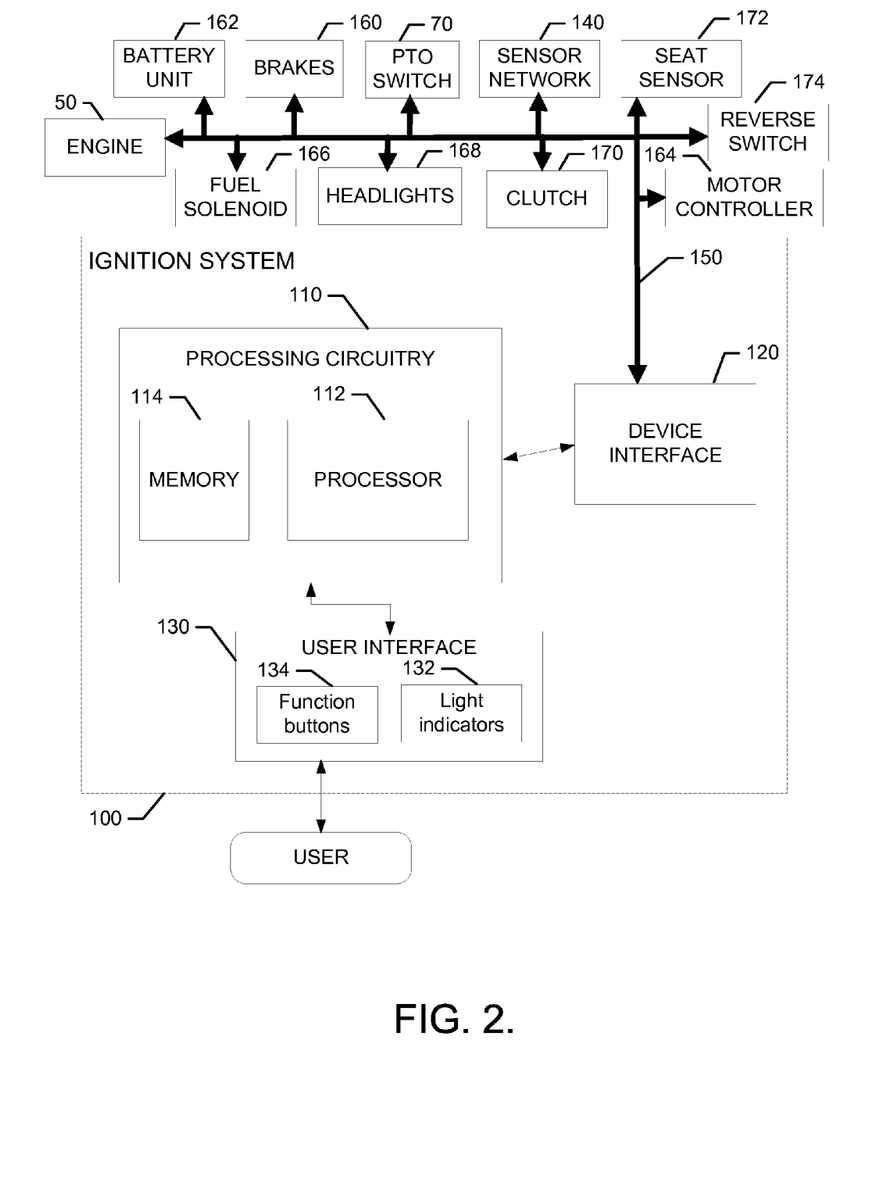
FIG. 2 illustrates a functional block diagram for explaining the operation of an ignition system of an example embodiment.

FIG. 2 illustrates a functional block diagram for explaining the operation of an ignition system 100 of an example embodiment. As shown in FIG. 2, the ignition system 100 may include processing circuitry 110 to control starting of the engine 50 of the riding lawn care vehicle 10 of an example embodiment as described herein. In this regard, for example, the ignition system 100 may utilize the processing circuitry 110 to provide electronic control inputs to one or more functional units of the riding lawn care vehicle 10 and to process data generated by the one or more functional units regarding various operational parameters relating to the riding lawn care vehicle 10. The processing circuitry 110 may be configured to perform data processing, control function execution and/or other processing and management services according to an example embodiment of the present invention. In some embodiments, the processing circuitry 110 may be embodied as a chip or chip set. In other words, the processing circuitry 110 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 110 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 110 may include one or more instances of a processor 112 and memory 114 that may be in communication with or otherwise control a device interface 120 and, in some cases, a user interface 130. As such, the processing circuitry 110 may be embodied as a circuit chip (e.g., an integrated circuit chip) configured (e.g., with hardware, software or a combination of hardware and software) to perform operations described herein. However, in some embodiments, the processing circuitry 110 may be embodied as a portion of an on-board computer. In some embodiments, the processing circuitry 110 may communicate with electronic components and/or sensors of a sensor network 140 (e.g., sensors that measure variable values related to riding lawn care vehicle parameters) of the riding lawn care vehicle 10 via a single data bus (e.g., data bus 150). As such, the data bus 150 may connect to a plurality or all of the sensors, switching components and/or other electrically controlled components of the riding lawn care vehicle 10 to the processing circuitry 110.

In an example embodiment, the data bus 150 may further provide a mechanism by which the processing circuitry 110 can interface with or control other functional units of the riding lawn care vehicle 10. For example, in some embodiments, the data bus 150 may provide control inputs to and/or receive status inputs from functional units such as any or all of the engine 50, PTO switch 70, brakes 160 (which may include a parking brake), a battery unit 162, one or more motor controllers 164, a fuel solenoid 166, headlights 168, clutch 170, seat sensor 172, reverse switch 174 and/or the like.

The user interface 130 may be in communication with the processing circuitry 110 to receive an indication of a user input at the user interface 130 and/or to provide an audible, visual, mechanical or other output to the user. As such, the user interface 130 may include, for example, a display, one or more levers, switches, buttons or keys (e.g., function buttons), and/or other input/output mechanisms. In an example embodiment, the user interface 130 includes the ignition interface 80, which may further include a plurality of light indicators 132 and a plurality of function buttons 134 that will be described in greater detail below.

The light indicators 132 may LEDs or LED backlit images that are lit or unlit to indicate corresponding status information. The information indicated by the light indicators 132 may be directly related to the corresponding function buttons 134 in some cases. However, in other cases, some of the light indicators 132 may indicate status information associated with other functional units (e.g., those connected to the data bus 150). Meanwhile, the function buttons 134 may be employed for initiation of various control operations to actuate or turn off corresponding ones of the functional units. However, in an example embodiment, the function buttons 134 may also have an alternative functionality associated with starting of the engine 50. In this regard, for example, the function buttons 134 may be used for the provision of a code that is required to start the engine 50. In an example embodiment, the function buttons 134 may include one button that functions as a start button that must be depressed or otherwise actuated in order to start the engine 50. However, the start button may not be enabled for operation to start the engine 50 until an unlocking code is entered via other ones of the function buttons 134. Thus, the function buttons 134 may include at least some code entry or unlocking buttons and a start button and the start button may only be unlocked for starting responsive to entry of an unlocking code using the code entry or unlocking buttons.

The device interface 120 may include one or more interface mechanisms for enabling communication with other devices (e.g., sensors of the sensor network 140 and/or other accessories or functional units such as motors, engines, servos, switches or other operational control devices for providing control functions). In some cases, the device interface 120 may be any means such as a device or circuitry embodied in either hardware, or a combination of hardware and software that is configured to receive and/or transmit data from/to sensors in communication with the processing circuitry 110 via the data bus 150. Thus, for example, the device interface 120 may provide interfaces for communication of components of the riding lawn care vehicle 10 via the data bus 150.

The processor 112 may be embodied in a number of different ways. For example, the processor 112 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 112 may be configured to execute instructions stored in the memory 114 or otherwise accessible to the processor 112. As such, whether configured by hardware or by a combination of hardware and software, the processor 112 may represent an entity (e.g., physically embodied in circuitry—in the form of processing circuitry 110) capable of performing operations according to embodiments of the present invention while configured accordingly. Thus, for example, when the processor 112 is embodied as an ASIC, FPGA or the like, the processor 112 may be specifically configured hardware for conducting the operations described herein. Alternatively, as another example, when the processor 112 is embodied as an executor of software instructions, the instructions may specifically configure the processor 112 to perform the operations described herein.

In an example embodiment, the processor 112 (or the processing circuitry 110) may be embodied as, include or otherwise control the operation of the ignition system 100 based on inputs received by the processing circuitry 110 responsive to positioning of the function buttons 134 and/or the operation of various ones of the functional units. As such, in some embodiments, the processor 112 (or the processing circuitry 110) may be said to cause each of the operations described in connection with the ignition system 100 in relation to operation of the functional units and/or function buttons 134 to undertake the corresponding functionalities responsive to execution of instructions or algorithms configuring the processor 112 (or processing circuitry 110) accordingly. In an example embodiment, the processor 112 may be physically located within a body that houses the electronics for the ignition interface 80, and the processor 112 may be the processor for the entire riding lawn care vehicle 10.

In an exemplary embodiment, the memory 114 may include one or more non-transitory memory devices such as, for example, volatile and/or non-volatile memory that may be either fixed or removable. The memory 114 may be configured to store information, data, applications, instructions or the like for enabling the processing circuitry 110 to carry out various functions in accordance with exemplary embodiments of the present invention. For example, the memory 114 could be configured to buffer input data for processing by the processor 112. Additionally or alternatively, the memory 114 could be configured to store instructions for execution by the processor 112. As yet another alternative or additional capability, the memory 114 may include one or more databases that may store a variety of data sets responsive to input from the sensor network 110, functional units and/or the function buttons 134. Among the contents of the memory 114, applications may be stored for execution by the processor 112 in order to carry out the functionality associated with each respective application. In some cases, the applications may include instructions for recognition of various input signals related to engine ignition as described herein.

In an example embodiment, various ones of the functional units may impact each other. For example, the PTO switch 70 (which may be an electric or manual switch) may be used to alter a position of the clutch 170. Likewise, the motor controller 164 (if employed) may impact the application of battery power from the battery unit 162 to either a drive motor or a cutting motor. The position of the fuel solenoid 166 may impact operation of the engine 50 by cutting off or allowing fuel to reach the engine 50 in embodiments where the engine 50 is a gasoline engine. Inputs regarding position of the brakes 160 and/or the PTO switch 70 may impact operation of the clutch 170, engine 50 and/or the like. Battery unit 162 status, status of the headlights 168 and/or other sensor network component status may be reported to and/or controlled by operation of the function buttons 134. Accordingly, it should be appreciated that the ignition system 100 of an example embodiment, and particularly the data bus 150 and the processing circuitry 110 may enable the user interface 130 to provide a relatively robust interface mechanism for controlling starter operation and numerous other functions of the riding lawn care vehicle 10.

Figure 3A:
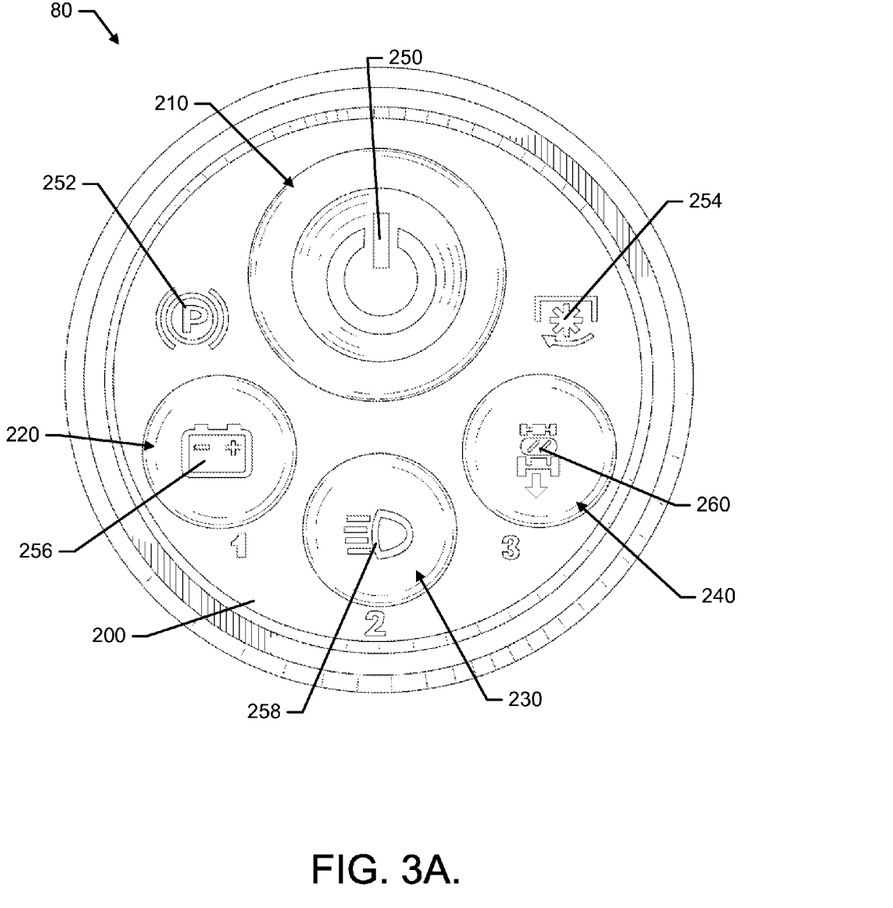
FIGS. 3A and 3B, illustrates a plan view and a perspective view, respectively, of an arrangement of the ignition interface of an example embodiment.
Figure 3B:
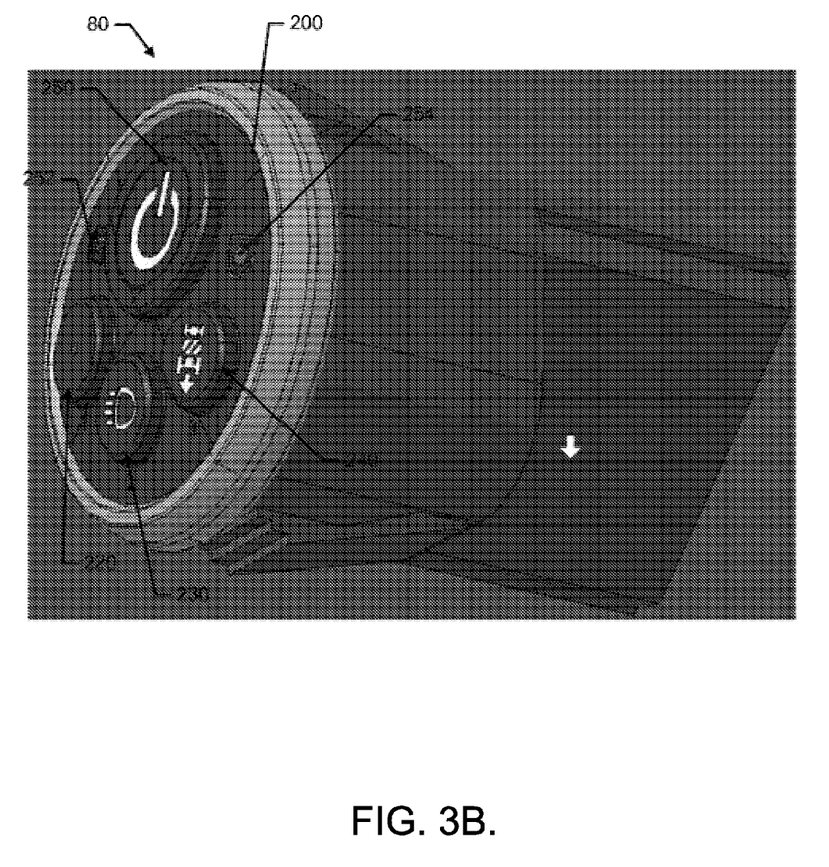

FIG. 3, which includes FIGS. 3A and 3B, illustrates a plan view and a perspective view, respectively, of an arrangement of the ignition interface 80 of an example embodiment. In this regard, FIG. 3B illustrates an assembly which may include a housing in which circuitry of the ignition interface 80 may be housed. The housing may be plugged into a receptacle of the operations panel 14 to plug into a system of wiring and/or circuitry of the riding lawn care vehicle 10. As shown in FIG. 3, the ignition interface may include a panel face 200 onto which the light indicators 132 and the function buttons 134 are provided. In this example, the panel face 200 is round and includes raised buttons (i.e., the function buttons 134) provided thereon. Meanwhile, the light indicators 132 may be provided in the panel face 200 itself, or in one or more of the function buttons 134. The light indicators 132 may each be a single color or may have multiple potential colors. In some cases, the light indicators 132 may have variable intensity so that brightness may ramp up (or down) over time. In some cases, the ramp up or down function may be based on external conditions. For example, if it is dark, a ramp up may be initiated. Blinking, lighting patterns and/or color changes may indicate specific conditions or operation modes related to respective different ones of the light indicators 132, or to the operation of the ignition interface 80 in general.

The ignition interface 80 may have multiple modes of operation that impact the functioning of the ignition system 100 and various other components of the riding lawn care vehicle 10. In an example embodiment, the ignition interface 80 may have an off or sleep mode, a wake-up mode, a ready to start or starting mode, and a running mode. The wake-up mode and the starting mode may generally be transient modes that are not allowed to be maintained for a long period of time. As such, the wake-up mode and the starting mode may each have time limits associated therewith such that if no activity is noted in each respective mode within a given period of time, the ignition interface 80 will be returned to one of the non-transient modes of operation (i.e., the sleep mode or the running mode). The sleep mode and the running mode are generally capable of continued and indefinite operation as long as other prerequisites to operation in such modes are met.

As shown in FIG. 3, a power button 210, a first key 220 a second key 230 and a third key 240 may each be examples of function buttons 134. The function buttons 134 may be any kind of pushbutton, press button or the like. Thus, the function buttons 134 may be flush-mounted or may extend outward from the panel face 200. Actuation of the function buttons 134 may initiate a changing of a switch position or an indication to the processing circuitry 110 to indicate that a corresponding function button 134 has been actuated. In some cases, the function buttons 134 may be biased switches that return to their original position after each actuation thereof. Thus, a most recent position or current status of the function buttons 134 may be maintained within the processing circuitry 110 and the processing circuitry 110 may also interface with other appropriate devices to actuate the functionality associated with any one of the function buttons 134 that is actuated and/or to turn on any light indicators 132 or other display indications that are appropriate to indicate the status of a device impacted by operation of one of the function buttons 134.

Meanwhile, a first light 250, a second light 252, a third light 254, a fourth light 256, a fifth light 258 and a sixth light 260 may be examples of light indicators 234. In an example embodiment, the first light 250 may be associated with the power button 210 and may indicate engine status and/or ignition interface 80 mode of operation. The first light 250 may be capable of showing different colors dependent upon the mode of operation of the ignition interface 80. The first light 250 may also blink according to specific patterns that indicate receipt of information or a mode of operation.

The second light 252 may be a parking brake indicator light that is lit when the parking brake is or is not set, depending on the current mode. For example, when a fault associated with the parking brake is detected, the second light 252 may be lit. As such, if setting of the parking brake is a precondition for engine starting, and the parking brake is not set, the second light 252 may be lit and may clear when the parking brake is set. The second light 252 may also be lit in instances where all lights, or combinations of lights, are lit to indicate certain faults. The third light 254 may be a PTO engagement indicator light that is lit when the PTO is engaged and off when the PTO is not engaged. The second and third lights 252 and 254 may not be specifically or physically associated with any one of the function buttons 134.

The fourth light 256 may be a battery light that indicates a status of the battery unit 162 when lit. For example, the fourth light 256 may be lit whenever battery level is low. In some embodiments, pressing the fourth light 256 may present an inquiry as to charge status of the battery. The fourth light 256 may present a color or a blink pattern to indicate current state of charge of the battery. The fourth light 256 may be disposed on the first key 220.

The fifth light 258 may be a headlight indicator light that is lit when the headlights 168 are energized and off when they are not energized. In some embodiments, the headlights may ramp up to full brightness over time when they are energized, and may ramp down to being off when they are de-energized. The headlights may stay on for a delay period after engine shutdown if the operator does not manually turn them off using the second key 230. If the headlights are turned on without the engine running, they may automatically shutoff after a specified period of time (e.g., two minutes). In some embodiments, if the engine is not running, the operator may be required to enter a valid code to turn on the headlights. However, if the headlights turn off after the automatic shutoff period, the operator may have a relatively short window of time during which the lights may be turned back on without reentry of the code. In some cases, the fifth light 258 may also light to indicate faults associated with the headlights (e.g., one or more burned out bulbs). The fifth light 258 may be disposed on the second key 230.

The sixth light 260 may be a mow-in-reverse (MIR) indicator light that is lit when MIR is activated and off when MIR is not activated. However, in some embodiments, the sixth light 260 may be used to indicate whether steering handles are in the park position. The sixth light 260 may light or blink to indicate various fault conditions associated with MIR or with the position of steering handles. In some cases, the sixth light 260 may have an amber color. The sixth light 260 may be disposed on the third key 240.

In an example embodiment in which the first, second and third keys 220, 230 and 240 each have a corresponding light indicator associated therewith (e.g., fourth light 256, fifth light 258 and sixth light 260), the corresponding light indicators may be associated with one of the functional operations that the respective keys are capable of initiating in at least one operating mode of the ignition interface 80. However, since the first, second and third keys 220, 230 and 240 may have multiple functions (i.e., different functions in different modes) and one such function may be code entry, in some embodiments, a code value or number associated with each respective one of the first, second and third keys 220, 230 and 240 may be indicated on or proximate to each key. Thus, for example, if a valid starting code is "1-3-2," the operator may be enabled to correlate the value "1" with the first key 220, and correlate the value "3" with the third key 240, while correlating the value "2" with the second key 230. The operator may then enter each key actuation in sequence to unlock the functionality of the power button 210 for engine startup. In other words, the code entry keys may enter the code for shifting from wake-up mode to starting mode.

The first, second and third keys 220, 230 and 240 of an example embodiment may each be multi-function buttons that have different corresponding functions dependent upon the status or mode of operation of the ignition interface 80. Moreover, the first, second and third keys 220, 230 and 240 may interface with the processing circuitry 110 to determine the mode of operation of the ignition interface 80. As an example, in one embodiment the first, second and third keys 220, 230 and 240 may be code entry buttons while the ignition interface 80 is in a wake-up mode and may actuate specific associated functionalities while the ignition interface 80 is in the running mode. In some embodiments, the first, second and third keys 220, 230 and 240 may have no function when in a ready to start or starting mode.

Thus, in an example embodiment, the first, second and third keys 220, 230 and 240 may be multi-function keys that have a different function in at least two (or in each) different operating mode of the ignition interface. In some cases, the first, second and third keys 220, 230 and 240 may further provide the sole mechanism by which operation is enabled to shift between at least two operating modes of the ignition interface 80 (e.g., the wake-up mode and the starting mode). Moreover, in at least one operating mode of the ignition interface 80, the first, second and third keys 220, 230 and 240 may have no impact on functional units of the riding lawn care vehicle 10, while they direct operation of respective ones of the functional units in at least one other operating mode of the ignition interface 80.

As an example, the first, second and third keys 220, 230 and 240 may be code entry keys (but not impact any functional units) in a wake-up mode of the ignition interface 80. However, in the running mode of the ignition interface 80, the first key 220 may be used to indicate battery status via the fourth light 256, the second key 230 may operate headlights 162 and may indicate headlight status via the fifth light 258, and the third key 240 may engage/disengage MIR and indicate MIR status via the sixth light 260.

Meanwhile, the power button 210 may also be a multi-function key insofar as the power button 210 may have a different function in each of at least two different operating modes of the ignition interface 80. For example, the power button 210 may wake the ignition interface to initiate the wake-up mode when the ignition interface 80 is initially off or in a sleep mode. Thereafter, the power button 210 may have no function other than to indicate the wakeup mode (e.g., via the first light 250) in the wake-up mode. However, the power button 210 may be enabled to initiate engine start responsive to operation thereof in the starting mode (and may also indicate the starting mode via the first light 250). The power button 210 may then be enabled to stop engine operation in the running mode.

Figure 4A:
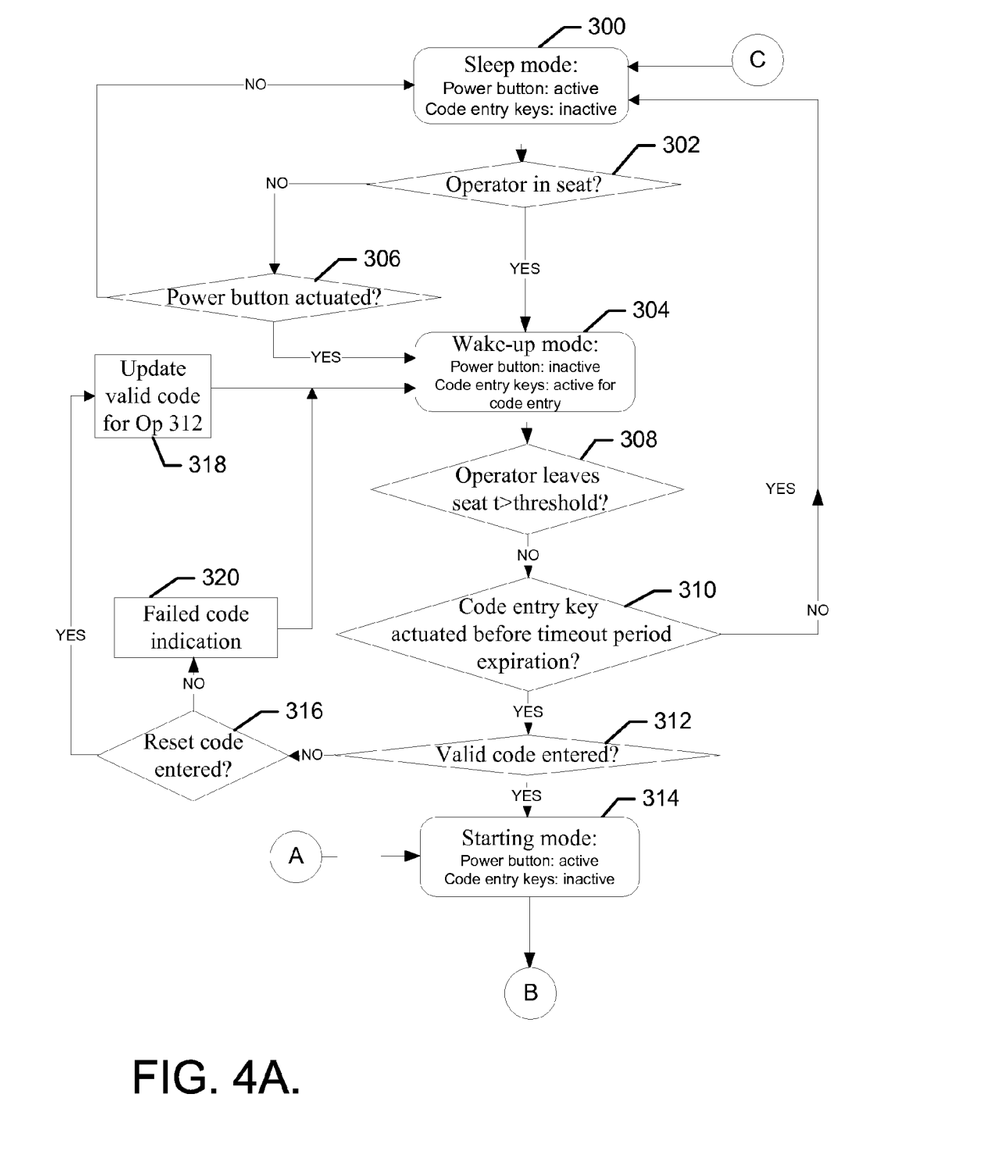
FIGS. 4A and 4B, illustrates an example of a control algorithm according to an example embodiment.
Figure 4B:
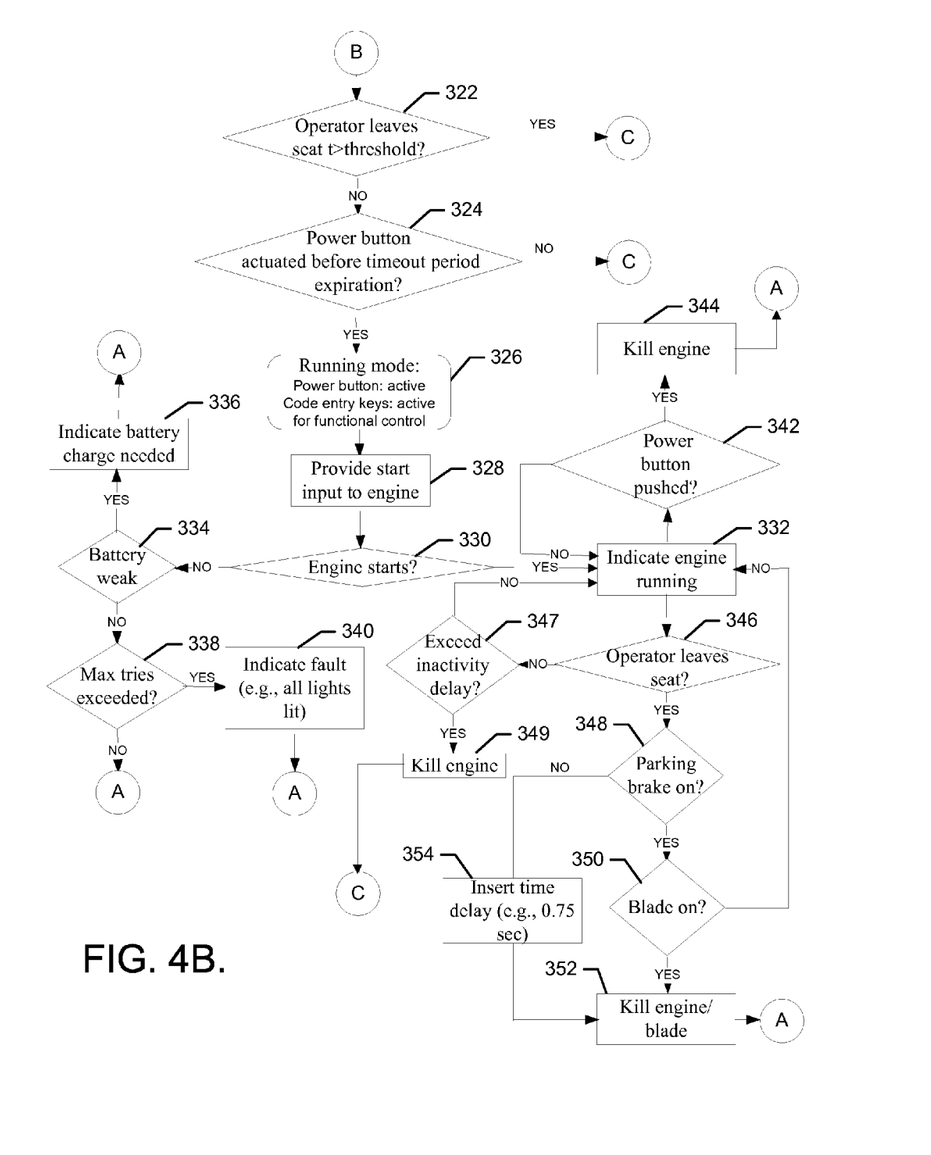

FIG. 4, which includes FIGS. 4A and 4B, illustrates an example of a control algorithm according to an example embodiment. It should be appreciated that the control algorithm may be executed by a processor or processing circuitry. Thus, for example, the operations described herein may be executed by processing circuitry 110. In an example embodiment, the ignition interface 80 may initially be off or in sleep mode at operation 300. A determination may be made as to whether the seat sensor 172 indicates presence of an operator in the seat at operation 302. If operator presence is detected in the seat, ignition interface 80 mode of operation may shift to the wake-up mode at operation 304. However, if no operator presence is detected as a result of operation 302, a determination may be made as to whether the power button 210 has been actuated at operation 306. If the power button 210 is actuated, ignition interface 80 mode of operation may shift to the wake-up mode at operation 304. However, if the power button 210 is not actuated, the ignition interface 80 may remain in sleep mode returning to operation 300.

When wake-up mode is initiated, a determination may be made as to whether seat presence is discontinued for greater than a threshold time at operation 308. If seat presence is discontinued for greater than the threshold time, then the ignition interface 80 returns to sleep mode and operation 300. However, if seat presence is not discontinued for greater than the threshold time, a determination is made as to whether the first key 220, the second key 230, and/or the third key 240 (i.e., code entry keys) are actuated before a timeout period expires at operation 310. If the timeout period expires before any code entry key is actuated, the ignition interface 80 returns to sleep mode and operation 300. However, if a code entry key is actuated, a determination as to whether a valid code is entered is made at operation 312. If a valid code is entered, the ignition interface 80 transitions to a ready to start mode or starting mode at operation 314. However, if an invalid code is entered, a determination may be made as to whether the combinations of keys entered or being held is a reset code at operation 316. If the key combination entered or being held is a reset code, then code entry may be received to define a new code and memory may be updated with the new valid code for comparison when operation 312 is executed in the future at operation 318. Flow may then return to operation 304. If the key combination entered or being held is not the reset code, then a failed code indication may be provided at operation 320 and flow may then return to operation 304.

Picking up on FIG. 4B, when in the starting mode, a determination may be as to whether seat presence is discontinued for greater than a threshold time at operation 322. If seat presence is discontinued for greater than the threshold time (e.g., about 3 seconds), then the ignition interface 80 returns to sleep mode and operation 300. However, if seat presence is not discontinued for greater than the threshold time, a determination is made as to whether the power button 210 is actuated before a timeout period expires at operation 324. If the timeout period expires before any code entry key is actuated, the ignition interface 80 returns to sleep mode and operation 300. However, if the power button is actuated before the timeout period expires (e.g., about 30 seconds), then the ignition interface may transition into running mode at operation 326 and an input may be provided to start the engine at operation 328.

A determination may then be made as to whether the engine starts at operation 330. If the engine starts, an indication may be provided (e.g., via the first light 250 being lit, or being a specific color (e.g., solid green)) that the engine is running at operation 332. If the engine does not start, a determination may be made as to whether the battery level is low at operation 334. If the battery level is low, an indication may be provided that the battery should be charged at operation 336. Thereafter, flow may return to operation 314 thereby shifting to the starting mode. If the battery level is not low a determination may be made as to whether the current attempt represents an attempt exceeding a maximum specified number of tries that may be attempted at operation 338. If the maximum specified number of tries is not exceeded, flow may return to operation 314 to shift to the starting mode. However, if the maximum specified number of tries is exceeded, a fault indication may be provided at operation 340. In some cases, the fault indication may be provided via lighting all light indicators 132.

During running mode operation when the engine is running, various conditions may be monitored to determine whether a change is state is required. For example, monitoring may be undertaken to determine whether the power button is pushed at operation 342. If the power button is pushed during running mode operation, the engine may be stopped at operation 344 and flow may return to operation 314 shifting into the starting mode. Monitoring may also continuously be provided to determine whether the operator leaves the seat at operation 346. If the operator leaves the seat, a determination may be made as to whether the parking brake is on at operation 348. If the parking brake is on, a further determination may be made as to whether the blade is on or turning at operation 350. If the blade is not on or turning, the engine may be allowed to continue to run. However, if the blade is turning, the engine may be killed at operation 352 and flow may return to operation 314 to shift to the starting mode. Meanwhile, if the parking brake is not on when the operator leaves the seat, a relatively short time delay may be inserted at operation 354 and the engine may be killed immediately upon expiration of the time delay at operation 352 and flow may return to operation 314 to shift to the starting mode. If the operator does not leave the seat, a determination may be made as to whether an inactivity delay is exceeded at operation 347. For example, if the engine is running while the operator is seated, but no activity occurs for five minutes, the inactivity delay may be exceeded. Upon exceeding the inactivity delay, the engine may be killed at operation 349 and the mower may go into sleep mode.

As shown in FIG. 4, during the sleep mode, the power button 210 may be active so that a transition to the wake-up mode will be possible via selection of the power button 210. However, the code entry keys (e.g., the first, second and third keys 220, 230 and 240) may be inactive. Thus, any actuation of the code entry keys may not generate a response from the system in the sleep mode. In the sleep mode, all light indicators 132 may be off.

During the wake-up mode, the power button 210 may be inactive. Thus, although the first light 250 may be lit to indicate that the ignition interface 80 is in the wake-up mode (e.g., having a color corresponding to the wake-up mode or blinking with a pattern or at a duty cycle indicative of the wake-up mode), any actuation of the power button 210 while the ignition interface 80 is in the wake-up mode may not cause any response. However, the code entry keys are active in the wake-up mode so that code entry may be accomplished. If there are prerequisite conditions that are required in order to permit engine start, some embodiments may display such conditions in the wake-up mode (e.g., via the light indicators 132) so that the operator may be informed to clear or initiate specific conditions to provide for meeting of prerequisite conditions to permit engine start. Code entry may only be permitted in some embodiments, when certain prerequisite conditions (e.g., parking brake on, PTO off, etc.) have been met.

In an example embodiment, the operator may sequentially enter key presses in accordance with a code, and/or may press and hold a combination of keys in accordance with a code in order to shift the ignition interface 80 into the starting mode. In some embodiments, while in the wake-up mode, any status that currently exists that would prevent engine start may be indicated via the light indicators 132. For example, if the PTO is on, the third light 254 may be lit until the PTO is disengaged. Meanwhile, for example, if the parking brake is off, the second light 252 may be lit until the parking brake is engaged. When the PTO is off and the parking brake is engaged, lights other than the first light 250 may be off, and code entry may be completed to shift the ignition interface 80 into the starting mode.

During the starting mode, the first light 250 may be lit to indicate that the ignition interface 80 is in the starting mode (e.g., having a color corresponding to the starting mode or blinking with a pattern or at a duty cycle indicative of the starting mode). The power button 210 may be active in the starting mode and, assuming all prerequisites for starting the engine are met, actuation of the starting mode may cause engine start to be initiated so that if the engine starts, a shift to the running mode may be accomplished. In some embodiments, the code entry keys may be inactive during the starting mode.

During the running mode, the first light 250 may be lit to indicate that the ignition interface 80 is in the running mode (e.g., having a color corresponding to the running mode or blinking with a pattern or at a duty cycle indicative of the running mode). The power button 210 may be active in the running mode and, when actuated, may cause the engine to be stopped and the ignition interface 80 to shift back to the starting mode or the sleep mode. In the running mode, at least some of the code entry keys may have a different functionality than they have in the wake-up mode.

In some embodiments, audible feedback may also be provided relative to one or more inputs received. The audible feedback may also, in some cases, be indicative of the operating mode or of receipt of valid or invalid inputs in one or more of the operating modes. The audible feedback may be in the form of beeps, alarms, voice instructions, tones, patterns of tones, and/or the like. Light and/or audible feedback may be used to assist in troubleshooting in some embodiments. As indicated above, the lights may indicate operational characteristics that may be useful in troubleshooting. However, in some embodiments, further troubleshooting may be possible by enabling the operator to engage the ignition interface 80 in a troubleshooting mode. In such a mode, the function buttons 134 may be used to provide inputs or queries to move through a troubleshooting procedure and the light indicators 132 may blink or light in patterns to indicate various conditions that can be correlated to a troubleshooting procedure. Moreover, in some embodiments, the ignition interface 80 or at least the processing circuitry 110 may be capable of being accessed externally (e.g., via a USB port) for troubleshooting purposes.

Figure 5:
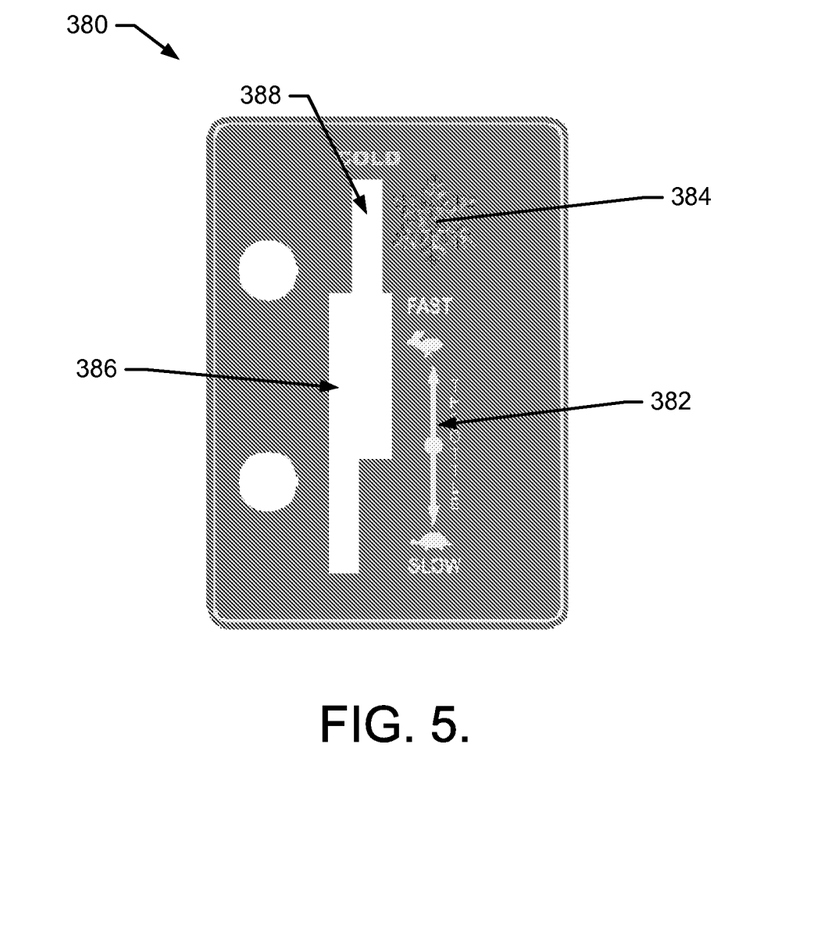
FIG. 5 illustrates an example of a cold start indicator of an example embodiment.

In some embodiments, the operations panel 14 may further include a "cold start" indicator. For example, the operations panel may include a combination throttle/choke lever and corresponding indicator panel 380. FIG. 5 illustrates an example of a cold start indicator of an example embodiment. The indicator panel 380 may include a throttle control indicator 382 and a cold start indicator 384. The throttle/choke lever may be positionable within the slot 386 and the operator may be able to move the lever within the slot 386. The throttle/choke lever may be used to adjust the fuel-air mixture entering the engine by, for example, adjusting throttle and/or choke valves in a carburetor in response to movement of the lever. As illustrated, in an example embodiment the lever can be moved between a "slow" position, a "fast" position, and a "cold" position. In the "slow" position the fuel is restricted by, for example, the partial closing of the throttle value. The "slow" position may be suitable for engine idling. As the throttle/choke lever is moved from the "slow" position toward the "fast" position greater amounts of fuel are allowed into the engine in response to, for example, the opening of the throttle value. The "fast" position may be suitable for driving and cutting operations of the lawn care device. When the throttle/choke lever is moved into the "cold" position, the fuel mixture is enriched (i.e., a higher fuel to air ratio mixture is permitted into the engine) by, for example, at least partially closing the choke valve to restrict air flow into the carburetor while the throttle valve remains open. The "cold" position of the lever (also sometimes referred to as a "choke" position) is used to start the engine when it is cold and a richer fuel mixture is needed or desired for starting the engine. Once the engine is started, the lever can be moved from the "cold" position to the "fast" or "slow" throttle positions or, perhaps, somewhere in between.

In an example embodiment, the sensor network 140 may include a temperature sensor. If the processing circuitry 110 determines that the temperature is below a particular setpoint value stored in the memory, then the cold start indicator 384 may be lit in response to a command from the processing circuitry 110. However, if the processing circuitry 110 determines that the temperature is above a particular setpoint value stored in the memory, then the cold start indicator 384 may remain unlit. The temperature setpoint value may be prestored in the memory and be a value below which choke (or other fuel enrichment) is recommended by, for example, the manufacturer when starting the engine. In this way, the cold start indicator 384 may instruct the operator when the throttle/choke lever should be moved to the "cold" position to start the engine. The temperature sensor may be located to sense ambient temperature, engine temperature, or some other temperature in or around the lawn care device. The setpoint temperature may be determined by, for example, the manufacturer based on the particular location where temperature is being sensed, the type of lawn care device, and experimentation. In the illustration, the cold start indicator 384 includes a light (e.g., an LED) behind a snow-flake shaped window and the light is turned on and off to communicate with the operator. In other embodiments, the light can change colors responsive to the sensed temperature instead of turning on and off. In still other embodiments, the cold start indicator may communicate with the operator in other ways, such as via text or graphics provided on a display screen, an audible indicator provided through a speaker or buzzer, or some combination of communication devices.

Figure 6:
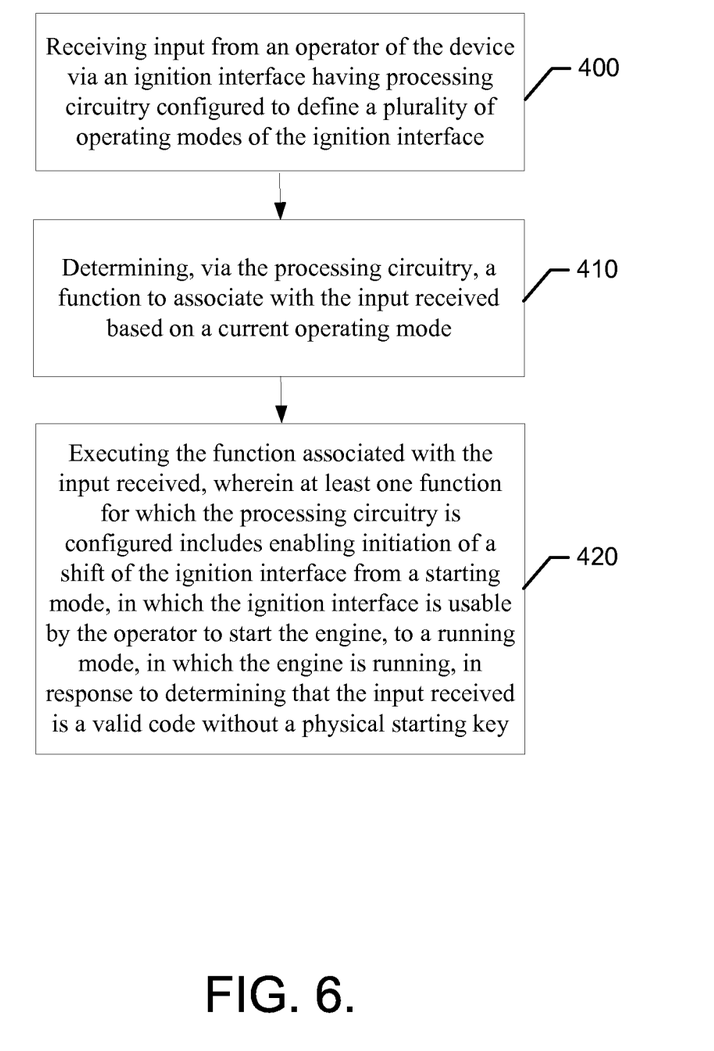
FIG. 6 provides a flow chart showing operation of a control algorithm according to an example embodiment.

In some cases, a method of enabling controlling operation of a lawn care device via an ignition system of an example embodiment may be provided. FIG. 6 illustrates a block diagram of such a method. In some embodiments, the processing circuitry 110 (which may include a processor capable of executing instructions stored in a non-transitory computer readable medium/memory) may be configured to implement a control algorithm for starting of the riding lawn care vehicle 10 according to the method.

In an example embodiment, the method may include receiving input from an operator of the device via an ignition interface having processing circuitry configured to define a plurality of operating modes of the ignition interface at operation 400, and determining, via the processing circuitry, a function to associate with the input received based on a current operating mode at operation 410. The method may further include executing the function associated with the input received at operation 420. At least one function for which the processing circuitry is configured may include enabling initiation of a shift of the ignition interface from a starting mode, in which the ignition interface is usable by the operator to start the engine, to a running mode, in which the engine is running, in response to determining that the input received is a valid code without a physical starting key.

In some embodiments, the method may include additional, optional operations, and/or the operations described above may be modified or augmented. Some examples of modifications, optional operations and augmentations are described below. In this regard, for example, in some cases, (1) the ignition interface may include code entry keys configured to, responsive to entry of a code via the code entry keys, enable use of the ignition interface to shift from the starting mode to the running mode. Additionally or alternatively, (2) determining the function may include associating the code entry keys with respective code values for code entry input in one mode and associating the code entry keys with a different functionality in at least one other mode. In some embodiments, (3) determining the function may include associating the code entry keys with an operational function in one mode and inactivating the code entry keys in at least one other mode.

In some embodiments, any or all of (1) to (3) may be employed and the method may further include providing a visual indication of the current operating mode via the ignition interface. In an example embodiment, any or all of (1) to (3) may be employed and executing the function comprises controlling a fuel solenoid of the lawn care device responsive to an event directing a shift out of the running mode. Additionally or alternatively, any or all of (1) to (3) may be employed and executing the function may include enabling a mow-in-reverse function responsive to operation of one of the code entry keys, and the one of the code entry keys may include a light indicative of mow-in-reverse function status.

In an example embodiment, a lawn care device is provided. The lawn care device may include an engine to selectively power the device, a frame supporting the engine and an operator of the device, and an ignition interface having processing circuitry configured to define a plurality of operating modes. The operating modes may include at least a starting mode in which the ignition interface is usable by the operator to start the engine, and a running mode in which the engine is running. The ignition interface may include code entry keys configured to, responsive to entry of a code via the code entry keys, enable use of the ignition interface to shift from the starting mode to the running mode without a physical starting key.

The lawn care device of some embodiments may include additional features that may be optionally added. For example, in some embodiments, (1) the ignition interface includes a power button and the code entry keys, and the power button and the code entry keys have different functionality associated therewith in the starting mode than in the running mode. Additionally or alternatively, (2) the processing circuitry may be further configured to define a sleep mode and a wake-up mode. In some cases, (3) the power button is inactive in the wake-up mode and active in the sleep mode, the running mode and the starting mode. Additionally or alternatively, (4) the code entry keys are inactive in the sleep mode and the starting mode. In an example embodiment, (5) the code entry keys are configured to provide code entry input to the processing circuitry in the wake-up mode to enable the power button to be operable to shift from the starting mode to the running mode. In some cases, (6) the code entry keys are configured to provide code entry input to the processing circuitry in one mode and at least one of the code entry keys defines a different functionality in at least one other mode.

In some embodiments, any or all of (1) to (6) may be employed, and the ignition interface includes a plurality of light indicators that are lit to indicate status information associated with the ignition interface. Additionally or alternatively, the ignition interface includes a plurality of light indicators and at least some of the light indicators are associated with specific ones of the code entry keys. In some embodiments, any or all of (1) to (6) may be employed, and the ignition interface includes a plurality of light indicators and at least some of the light indicators are not associated with specific ones of the code entry keys. Additionally or alternatively, the ignition interface includes a plurality of light indicators and a state of at least some of the light indicators is indicative of a current mode of the ignition interface. In some embodiments, any or all of (1) to (6) may be employed, and the processing circuitry receives information indicative of operational characteristics of the lawn care device via a data bus. In such an example, the processing circuitry may be configured to provide instructions to control a fuel solenoid of the lawn care device via the data bus responsive to an event directing a shift out of the running mode, to provide instructions to control a starter motor of the lawn care device to attempt to start the engine via the data bus responsive to a shift from the starting mode to the running mode, to control enablement of a mow-in-reverse function responsive to operation of one of the code entry keys where the one of the code entry keys includes a light indicative of mow-in-reverse function status, and/or to provide an indication of at least one prerequisite operational characteristic for enabling a shift to the starting mode that is not met to enable the operator to provide instruction via the data bus to meet the at least one prerequisite operational characteristic. Additionally or alternatively, the processing circuitry may be configured to receive an indication of presence of the operator in a seat of the device, and either provide an operating mode change responsive to receipt of an indication of the operator leaving the seat or direct an engine shutdown responsive to the device not having a parking brake applied or having a blade turning responsive to receipt of an indication of the operator leaving the seat. In some embodiments, any or all of (1) to (6) may be employed, and the ignition interface may be configured to provide a light pattern associated with at least one of the code entry keys to indicate whether the code entry key is currently configured to enable code entry or initiate a different function.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A lawn care device comprising:
an engine configured to selectively power the device;
a frame supporting the engine and an operator of the device; and
an ignition interface comprising processing circuitry configured to define a plurality of operating modes comprising at least:
a starting mode in which the ignition interface is usable by the operator to start the engine, and
a running mode in which the engine is running,
wherein the ignition interface comprises code entry keys configured to, responsive to entry of a code via the code entry keys, enable use of the ignition interface to shift from the starting mode to the running mode without a physical starting key, and
wherein each of the code entry keys is configured to provide code entry input to the processing circuitry in one mode and at least one of the code entry keys is configured to perform a function different than providing code entry input in at least one other mode, the function comprising controlling an operation of a functional unit of the lawn care device.

2. The lawn care device of claim 1, wherein the ignition interface comprises a power button and the code entry keys, and wherein the power button and the code entry keys have different functionality associated therewith in the starting mode than in the running mode.

3. The lawn care device of claim 2, wherein the processing circuitry is further configured to define a sleep mode and a wake-up mode.

4. The lawn care device of claim 3, wherein the power button is inactive in the wake-up mode and active in the sleep mode, the running mode, and the starting mode.

5. The lawn care device of claim 3, wherein the code entry keys are inactive in the sleep mode and the starting mode.

6. The lawn care device of claim 3, wherein the code entry keys are configured to provide code entry input to the processing circuitry in the wake-up mode to enable the power button to be operable to shift from the starting mode to the running mode.

7. The lawn care device of claim 1, wherein the ignition interface comprises a plurality of light indicators that are lit to indicate status information associated with the ignition interface.

8. The lawn care device of claim 1, wherein the ignition interface comprises a plurality of light indicators and at least some of the light indicators are associated with specific ones of the code entry keys.

9. The lawn care device of claim 1, wherein the ignition interface comprises a plurality of light indicators and at least some of the light indicators are not associated with specific ones of the code entry keys.

10. The lawn care device of claim 1, wherein the ignition interface comprises a plurality of light indicators and a state of at least some of the light indicators is indicative of a current mode of the ignition interface.

11. The lawn care device of claim 1, wherein the processing circuitry is configured to receive information indicative of operational characteristics of the lawn care device via a data bus, and
wherein the processing circuitry is configured to provide instructions to control a fuel solenoid of the lawn care device via the data bus responsive to an event directing a shift out of the running mode.

12. The lawn care device of claim 1, wherein the processing circuitry is configured to receive information indicative of operational characteristics of the lawn care device via a data bus, and
wherein the processing circuitry is configured to provide instructions to control a starter motor of the lawn care device to attempt to start the engine via the data bus responsive to a shift from the starting mode to the running mode.

13. The lawn care device of claim 1, wherein the processing circuitry receives information indicative of operational characteristics of the lawn care device via a data bus, and
wherein the processing circuitry is configured to provide instructions to control enablement of a mow-in-reverse function responsive to operation of one of the code entry keys, and wherein the one of the code entry keys comprises a light indicative of mow-in-reverse function status, or
wherein the processing circuitry is configured to provide an indication of at least one prerequisite operational characteristic for enabling a shift to the starting mode that is not met to enable the operator to provide instruction via the data bus to meet the at least one prerequisite operational characteristic.

14. The lawn care device of claim 1, wherein the ignition interface is configured to provide a light pattern associated with at least one of the code entry keys to indicate whether the code entry key is currently configured to enable code entry or initiate a different function.

15. The lawn care device of claim 1, wherein the processing circuitry is configured to receive an indication of presence of the operator in a seat of the device, and
wherein the processing circuitry is configured to provide an operating mode change responsive to receipt of an indication of the operator leaving the seat; or
wherein the processing circuitry is configured to direct an engine shutdown responsive to the device not having a parking brake applied or having a blade turning responsive to receipt of an indication of the operator leaving the seat.

16. The lawn care device of claim 1, wherein the processing circuitry is configured to receive an indication of environmental temperature, and
wherein the processing circuitry is configured to provide an indication to alert the operator that a cold start procedure is suggested responsive to the indication of environmental temperature being below a threshold temperature.

17. The lawn care device of claim 1, wherein the at least one of the code entry keys is operable to indicate a status of a functional unit of the lawn care device in the at least one other mode.

18. The lawn care device of claim 1, wherein the at least one of the code entry keys is operable to indicate a status of a first functional unit of the lawn care device in the at least one other mode, and another of the code entry keys is operable to control a second functional unit of the lawn care device in the at least one other mode.

19. The lawn care vehicle of claim 1, wherein the functional unit comprises a cutting deck and the function comprises mow-in reverse.

20. A method of controlling a lawn care device, the method comprising:
receiving input from an operator of the device via an ignition interface having processing circuitry configured to define a plurality of operating modes of the ignition interface;
determining, via the processing circuitry, a function to associate with the input received based on a current operating mode; and
executing the function associated with the input received, wherein at least one function for which the processing circuitry is configured comprises enabling initiation of a shift of the ignition interface from a starting mode, in which the ignition interface is usable by the operator to start the engine, to a running mode, in which the engine is running, in response to determining that the input received is a valid code without a physical starting key,
wherein the ignition interface comprises code entry keys configured to, responsive to entry of a code via the code entry keys, enable use of the ignition interface to shift from the starting mode to the running mode, and
wherein each of the code entry keys is configured to provide code entry input to the processing circuitry in one mode and at least one of the code entry keys is configured to perform a function different than providing code entry input in at least one other mode, the function comprising controlling an operation of a functional unit of the lawn care device.

* * * * *